(12) United States Patent
Chen et al.

(10) Patent No.: US 9,104,692 B2
(45) Date of Patent: Aug. 11, 2015

(54) RECORDING BACKUP INFORMATION FOR BACKED-UP DATA ITEMS IN A DATA ITEM LIST

(71) Applicant: International Business Machines Corporation, Armonk, NY (US)

(72) Inventors: Chao Chen, Beijing (CN); Ya Jie Li, Beijing (CN); Yu Meng Li, Beijing (CN); Wei Qin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 13/925,681

(22) Filed: Jun. 24, 2013

(65) Prior Publication Data

US 2014/0006353 A1    Jan. 2, 2014

(30) Foreign Application Priority Data

Jun. 28, 2012  (CN) .......................... 2012 1 0219685

(51) Int. Cl.
*G06F 17/30*    (2006.01)
*G06F 11/14*    (2006.01)

(52) U.S. Cl.
CPC ...... *G06F 17/30227* (2013.01); *G06F 11/1458* (2013.01); *G06F 17/3007* (2013.01); *G06F 11/1469* (2013.01)

(58) Field of Classification Search
USPC .......................................... 707/640, 648, 650
See application file for complete search history.

(56) References Cited

U.S. PATENT DOCUMENTS

| | | | | |
|---|---|---|---|---|
| 6,029,166 A * | 2/2000 | Mutalik et al. | ........................ | 1/1 |
| 6,161,111 A * | 12/2000 | Mutalik et al. | ................ | 707/823 |
| 6,584,477 B1 * | 6/2003 | Mosher, Jr. | ................... | 707/610 |
| 6,934,725 B1 * | 8/2005 | Dings | .......................... | 707/610 |
| 7,756,837 B2 | 7/2010 | Williams et al. | | |
| 7,966,293 B1 | 6/2011 | Owara et al. | | |
| 8,041,677 B2 | 10/2011 | Sumner et al. | | |
| 8,099,572 B1 * | 1/2012 | Arora et al. | ................... | 711/162 |
| 8,112,396 B2 | 2/2012 | Zal et al. | | |
| 8,121,983 B2 | 2/2012 | Prahlad et al. | | |
| 8,364,640 B1 * | 1/2013 | Beatty et al. | .................. | 707/640 |
| 2002/0156965 A1 * | 10/2002 | Gusler et al. | .................. | 711/100 |
| 2002/0184239 A1 * | 12/2002 | Mosher et al. | ................ | 707/200 |
| 2011/0161297 A1 | 6/2011 | Parab | | |
| 2013/0085995 A1 * | 4/2013 | Mostachetti et al. | ......... | 707/640 |

OTHER PUBLICATIONS

P. Huang et al., "Efficient Metadata Management in Net-Oriented Block-Level CDP" (online) available on Mar. 15, 2012 at URL: http://www.sciencedirect.com/science/article/pii/S1876610211040082, Total 1 page (Abstract Only).

D. Yibing et al., "A Novel Block-Level Continuous Data Protection System", New Trends in Information Science and Service Science (NISS), 2010 4th International Conference on Date of Conference: May 11-13, 2010, pp. 1-6.

* cited by examiner

*Primary Examiner* — Cam-Linh Nguyen
(74) *Attorney, Agent, or Firm* — David W. Victor; Konrad, Raynes, Davda and Victor LLP

(57) ABSTRACT

Provided are a computer program product, system, and method for recording backup information for backed-up data items in a data item list. In response to a backup operation of a data set, information is obtained of backed-up data items in the backup operation. Data item entries are maintained for the backed-up data items in a data item list of the backup information for the data set. A determination is made of the backed-up data items corresponding to the data item entries in the data item list. Status lists are added for the entries in the data item list including backed-up status flags having backup information on the backup operations for the backed-up data items corresponding to the data item entries in the data item list.

21 Claims, 5 Drawing Sheets

| Backed-up data items | Data item list | Backup 1 | | Backup k-1 | Data item list | Backup 1 | | Backup k-1 | Backup k |
|---|---|---|---|---|---|---|---|---|---|
| I3 | I0 | 1 | | 0 | I0 | 1 | | 0 | 0 |
| I10 | I1 | 1 | | 1 | I1 | 1 | | 1 | 0 |
| I8 | I2 | 1 | | 1 | I2 | 1 | | 1 | 0 |
| I5 | I3 | 1 | | 0 | I3 | 1 | | 0 | 1 |
| | I4 | 1 | | 1 | I4 | 1 | | 1 | 0 |
| | I5 | 1 | | 1 | I5 | 1 | | 1 | 1 |
| | I6 | 0 | | 0 | I6 | 0 | | 0 | 0 |
| | I7 | 0 | | 1 | I7 | 0 | | 1 | 0 |
| | I8 | 0 | | 1 | I8 | 0 | | 1 | 1 |
| | I9 | 0 | | 1 | I9 | 0 | | 1 | 0 |
| | | | | | I10 | 0 | | 0 | 1 |

A | B | C

| Created time | Backed-up data items |
|---|---|
| t0 | I0 |
| t1 | I1 |
| t4 | I4 |
| t5 | I5 |
| t6 | I6 |
| t8 | I8 |
| t10 | I10 |
| t11 | I11 |
| t12 | I12 |

A

| Created time | Data item list | | |
|---|---|---|---|
| t0 | I0 | | |
| t1 | I1 | | |
| t2 | I2 | | |
| t3 | I3 | | |
| t4 | I4 | | |
| t5 | I5 | | |
| t6 | I6 | | |
| t7 | I7 | | |
| t8 | I8 | | |
| t9 | I9 | | |

B

| Created time | Data item list | | | Backup k |
|---|---|---|---|---|
| t0 | I0 | | | 1 |
| t1 | I1 | | | 1 |
| t2 | I2 | | | 0 |
| t3 | I3 | | | 0 |
| t4 | I4 | | | 1 |
| t5 | I5 | | | 1 |
| t6 | I6 | | | 1 |
| t7 | I7 | | | 0 |
| t8 | I8 | | | 1 |
| t9 | I9 | | | 0 |
| t10 | I10 | | | 1 |
| t11 | I11 | | | 1 |
| t12 | I12 | | | 1 |

C

RECORDING BACKUP INFORMATION FOR BACKED-UP DATA ITEMS IN A DATA ITEM LIST

CROSS-REFERENCE TO RELATED FOREIGN APPLICATION

This application is a non-provisional application that claims priority benefits under Title 35, United States Code, Section 119(a)-(d) from Chinese Patent Application entitled "METHOD AND APPARATUS OF RECORDING BACKUP INFORMATION" by Ya JIE, Yu MENG, Chen CHAO, and Wei QIN, having Chinese Patent Application Serial No. 201210219685.X, filed on Jun. 28, 2012, which Chinese Patent Application is incorporated herein by reference in its entirety.

BACKGROUND OF THE INVENTION

1. Field of the Invention

The present invention relates to a computer program product, system, and method for recording backup information for backed-up data items in a data item list.

2. Description of the Related Art

With the rapid development of information technology, there is an increasingly huge amount of data to be stored and processed. The amount of data of many applications may be several hundred gigabytes (Gb) or even more. In general, an application data set usually includes many data items, and has an index file which will record information of respective data items in the data set. The information of data items may include: created time, size, and storage location of data items, and so on. In the case of a relatively huge application data set, the size of index file is also more than 1 Gb.

On the other hand, due to requirements of security, a variety of data often needs backup so as to prevent the risk of data loss. Typically, in order to complete data backup, the application data set is backed up into a server with mass storage space by means of a backup tool. Such backup may be regularly performed periodically, and alternatively may also be performed according to user settings. In the process of data backup, the backup tool backups the application data set together with its index file as a data packet into the server, and the server will store such data packet as one metadata. For each of such metadata, the server will create a description file, in which created time, size, and storage location of the metadata, and so on, are recorded. As a result, the server may record basic information of respective backup versions of the application data set according to backup time. Based on the basic information, a user may query and restore a particular version of the application data set according to the backup time.

However, in many cases, a user simply wants to query a particular data item in the application data set. Because the above backup and query mechanism cannot provide query for a particular data item, and the user usually cannot know for sure the created time or backup time of the data item to be queried, the user can only query with respect to respective versions of the data set. Specifically, the user needs to restore the index file of each version of the data set from the server, obtain information of data items according to the content of the index file, and then find a data item to be queried based on the information. However, in many cases, the backup of the data set is set to be regularly performed in a very short period, and especially in the case of incremental backup, a backup cycle is often at half an hour or even less. This results in a large number of different versions of the data set and the index files thereof. As mentioned earlier, in the case of a large data set, the size of an index file is often more than 1 G. Therefore, restoring each version of the index file from the server will cost a lot of time. Moreover, after the index file is restored, the user himself is still required to analyze respective index files one by one to find the data item to be queried. Undoubtedly, the above query process consumes a lot of time and effort of the user.

Therefore, there is a need for a solution that can improve backup and query of data items.

SUMMARY

Provided are a computer program product, system, and method for recording backup information for backed-up data items in a data item list. In response to a backup operation of a data set, information is obtained of backed-up data items in the backup operation. Data item entries are maintained for the backed-up data items in a data item list of the backup information for the data set. A determination is made of the backed-up data items corresponding to the data item entries in the data item list. Status lists are added for the entries in the data item list including backed-up status flags having backup information on the backup operations for the backed-up data items corresponding to the data item entries in the data item list.

BRIEF DESCRIPTION OF THE DRAWINGS

Through the more detailed description of exemplary embodiments of the present disclosure in conjunction with the accompanying drawings, the above and other objects, features and advantages of the present disclosure will become more apparent, wherein the same reference generally refers to the same components in the exemplary embodiments of the present disclosure.

DETAILED DESCRIPTION

In view of the issues raised hereinabove, described embodiments provide a solution that can record backup information in the process of backing up a data set to provide a backup status of a data item.

According to one embodiment, there is provided a method of recording backup information, comprising: in response to a backup operation of a data set, obtaining information of backed-up data items in the backup operation; containing the backed-up data items in a data item list of the backup information for the data set, and determining data items corresponding to the backed-up data items in the data item list; adding a status list corresponding to the backup operation in the backup information, so that the data items corresponding to the backed-up data items in the data item list have backed-up status flags in the status list.

According to another embodiment, there is provided an apparatus for recording backup information, comprising: an information obtaining unit configured to obtain, in response to a backup operation of a data set, information of backed-up data items in the backup operation; a data item list operation unit configured to contain the backed-up data items in a data item list of the backup information for the data set, and to determine data items corresponding to the backed-up data items in the data item list; a status list operation unit configured to add a status list corresponding to the backup operation in the backup information, so that the data items corresponding to the backed-up data items in the data item list have backed-up status flags in the status list.

With the described embodiments, the backup information in the process of backing up the data set can be recorded, so as to show backup statuses of respective data items in the data set in each backup operation. The recording of the backup information can provide great convenience to the query of data items.

Embodiments are described with reference to the accompanying drawings, in which embodiments have been illustrated. However, the described embodiments can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
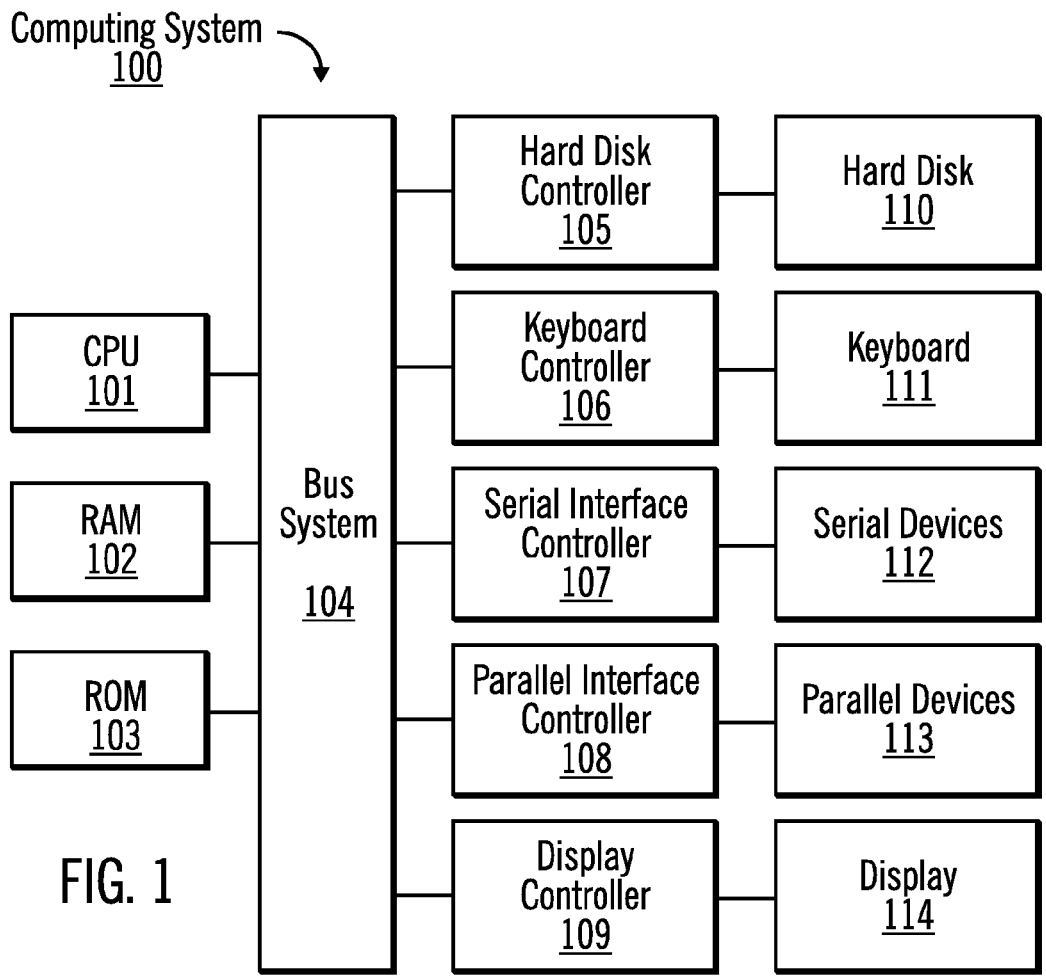
FIG. 1 shows a block diagram of a computer system in which embodiments are implemented.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, the described embodiments may be implemented as a system, method or computer program product. Accordingly, described embodiments may take the form of an entirely hardware embodiment, an entirely software embodiment (comprising firmware, resident software, micro-code, etc.) or an embodiment combining software and hardware aspects that may all generally be referred to herein as a "circuit," "module" or "system." Furthermore, described embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, comprising, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, comprising but not limited to wireless, wireline, optical fiber cable, RF, etc., or any suitable combination of the foregoing.

Computer program code for carrying out operations for aspects of the present invention may be written in any combination of one or more programming languages, comprising an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, comprising a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture comprising instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention will be described below in conjunction with the accompanying drawings. In these embodiments, backup and query of data will be improved by recording backup information in the process of backing up a data set. The backup information is intended to record backup statuses of respective data items in each backup. Based on such backup information, statuses of respective data items in each backup version can be learned, so as to provide possibilities for fast query of the data items.

Figure 2:
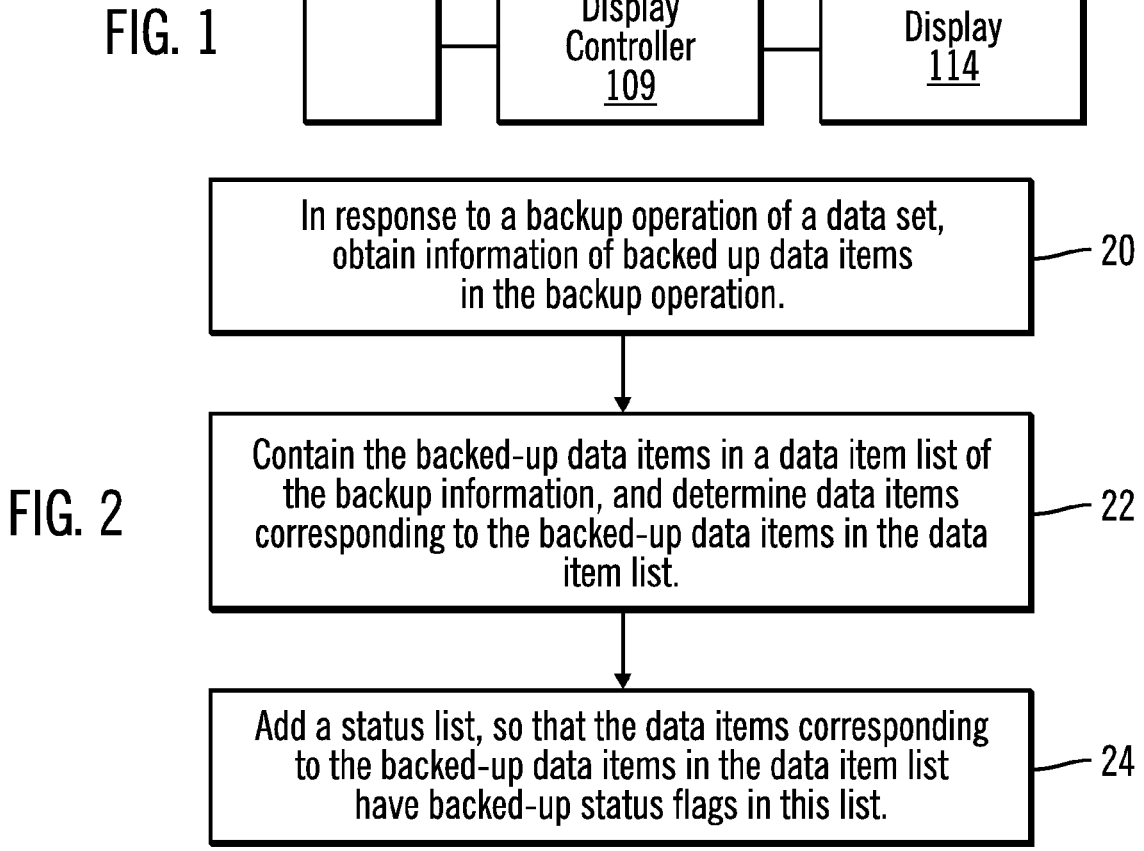
FIG. 2 illustrates an embodiment of operations to record backup information.

FIG. 2 shows a flowchart of a method of recording backup information according to an embodiment of the present invention. As shown in FIG. 2, the method of recording backup information of the embodiment comprises: step 20 of, in response to a backup operation of a data set, obtaining information of backed-up data items in the backup operation; step 22 of containing the backed-up data items in a data item list of the backup information of the data set, and determining data items corresponding to the backed-up data items in the data item list; and step 24 of adding a status list corresponding to the backup operation in the backup information, so that the data items corresponding to the backed-up data items in the data item list have backed-up status flags in the status list. The specific way of executing the above steps is described below in conjunction with specific examples.

First, in step 20, in response to a backup operation of a data set, relevant information of backed-up data items which are backed up in the backup operation is obtained. It should be appreciated that this step may be triggered by the backup operation of the data set. In one embodiment, the data set is backed up by a backup tool according to a pre-determined setting, such as a predetermined backup frequency (for example, one backup operation per hour), a predetermined backup event (for example, one backup operation whenever a certain number of files are updated), and so on. During the backup, the backup tool may send a backup request from local to a server and upon receiving an acknowledgement message from the server, start the transmission of backup data. In one embodiment, by detecting such backup request or acknowledgement message, the execution of the backup operation can be detected, and trigger the execution of step 20. In addition, the backup tool may also perform backup according to a manual selection by a user. In this case, the execution of the backup operation may also be detected by detecting the selection input of the user to trigger step 20.

In step 20, once the backup operation of the data set is detected, information corresponding to backed-up data items in the data set is obtained. The information of backed-up data items may comprise names of respective data items which have been backed up in this backup operation, identification information thereof, and other supplementary information. In one embodiment, the information of backed-up data items may be obtained by scanning or checking the backed-up data set. It should be appreciated that the index file of the data set often contains information related to data items currently in the data set, and therefore can be used as the basis to obtain information of backed-up data items. In one embodiment, the index file of the data set in the backup operation may be directly used as information of backed-up data items. Or, in another embodiment, the above index file can be analyzed to form the information of backed-up data items based on the required information extracted therefrom.

Based on the information of backed-up data items obtained in step 20, the following step of recording backup information may be executed. That is, in step 22, a data item list of backup information for the data set is made to include the backed-up data items and data items corresponding to the backed-up data items in the data item list are determined; and in step 24, a status list corresponding to the backup operation is added in the backup information so that in the data item list, the data items corresponding to the backed-up data items have backed-up status flags.

The above step 22 and step 24 are executed in a relatively simple way in the case where the backup operation is an initial backup operation for the data set. Accordingly, in one embodiment, the above method may comprise a step of first determining whether this backup operation is an initial backup operation for the data set. In one example, this step is implemented by setting a backup counter. The count of the counter is incremented by 1 whenever a backup operation for the data set is detected. As a result, the count of the backup counter may not only provide a judgment as to whether the backup operation is an initial backup, but also provide backup identification for each following backup operation, that is, the count of the backup counter may be used to represent and distinguish between different backup operations for the data set. On the other hand, since the recording of the backup information is made in response to the backup operation for the data set, in a case where this backup operation is an initial backup of the data set, there is no existing backup information, or, the backup information is null. Therefore, it can be judged whether this backup operation is an initial backup operation by judging the status of existing backup information through scanning. In addition, there may be other embodiments for judging ways.

As mentioned earlier, if the backup operation is the initial backup operation for the data set, then there is no existing backup information, and thus no existing data item list. Accordingly, step 22 is actually equivalent to creating a data item list based on backed-up data items in the initial backup operation, so that the data item list contains backed-up data items of the initial backup. Accordingly, this also creates the backup information. In one embodiment, backed-up data items may be used directly to constitute the data item list in the backup information. Since the present data item list may contain only backed-up data items of the initial backup, data items in the data item list may correspond one-to-one to the backed-up data items. Therefore, all data items in the data item list may be determined as data items corresponding to the backed-up data items.

Then, in step 24, a status list corresponding to the backup operation is added for the backup information created hereinabove. The list is intended to indicate whether respective data items in the data item list have been backed up in the backup operation. For backed-up data items, backed-up status flags are added therefore in the status list; while for non-backed-up data items, status flags indicating no backup are added in the status list.

For the initial backup operation, the data item list created in step 22 may only contain backed-up data items, namely, data items which have been backed up in this backup operation for the data set. Therefore, in step 24, backed-up status flags are added for all data items in the data item list in the status list corresponding to this backup operation.

Figure 3:
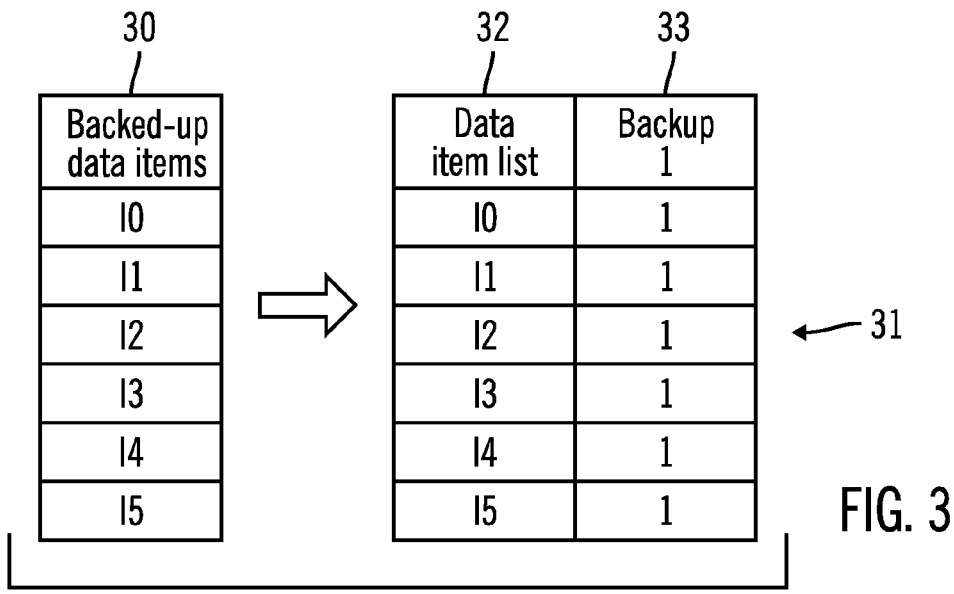
FIG. 3 illustrate an embodiment of backup information corresponding to an initial backup operation.

FIG. 3 shows backup information corresponding to the initial backup operation according to an embodiment. A schematic table 30 on the left side of FIG. 3 shows information of backed-up data items obtained in response to the initial backup operation for the data set. It can be seen from the schematic table 30 that in the initial backup operation for the data set, data items I0 to I5 are backed up. In order to record information related to this initial backup, backup information 31 on the right side is generated. Backup information 31 contains the created data item list 32 and the added status list 33. The data item list 32 is created according to the backed-up data items, and thus contains all backed-up data items of this backup operation, namely, data items I0 to I5. Since these data items are data items which have been backed up in this backup operation, then in the status list 33 corresponding to this backup operation, backed-up status flag 1 is added for all data items in the data item list 32.

It can be understood that, in the embodiment of FIG. 3, "1" is used as a backed-up status. Accordingly, "0" may be used as a non-backed-up status flag. However, the adoption of the status flag is not limited thereto. In another embodiment, "T" (true) is used as the backed-up status flag, while "F" (false) is used as a non-backed-up status flag. In another embodiment, "?" is used as the backed-up status flag, while "×" is used as a non-backed-up status flag. Those skilled in the art may also use a variety of different status flags, as long as they can show the two different backup statuses, i.e., backed-up or non-backed-up.

In the example in FIG. 3, the status list 33 corresponding to this backup operation further contains identification (backup 1) of this backup operation. This identification is based on the backup counter as previously described. However, it can be understood that other backup identification, such as backup time and the like, may also be used.

In the example in FIG. 3, the backed-up data items an d the data item list only contain the names of data items. However, in other embodiments, as needed, more information related to properties of the data items may be contained in the backed-up data items and the data item list. In one embodiment, identification information other than name may also be used to mark respective data items.

FIG. 3 shows backup information corresponding to the initial backup. The record of the backup information is relatively simple. However, after the initial backup operation, there is existing backup information. For each following backup operation for the data set, an expansion is needed on the basis of the existing backup information, and a new status list is added for each backup operation. Also, in order that the data item list contains backed-up data items of each backup operation, it is required to add new data items into the data item list when necessary. At this point, the data item list does not correspond to the backed-up data items one-to-one any longer, whereby it is further required to determine data items in the data item list corresponding to the backed-up data items, and to add backed-up status flags for these data items. By continually expanding backup information, the backup information is enabled to record backup statuses of respective data items in each backup operation. The method of expanding backup information by using backup operation related information, that is, specific execution of steps 22 and 24 in FIG. 2, is described below in conjunction with specific examples in the case where the backup information is not the initial backup.

Figure 4:
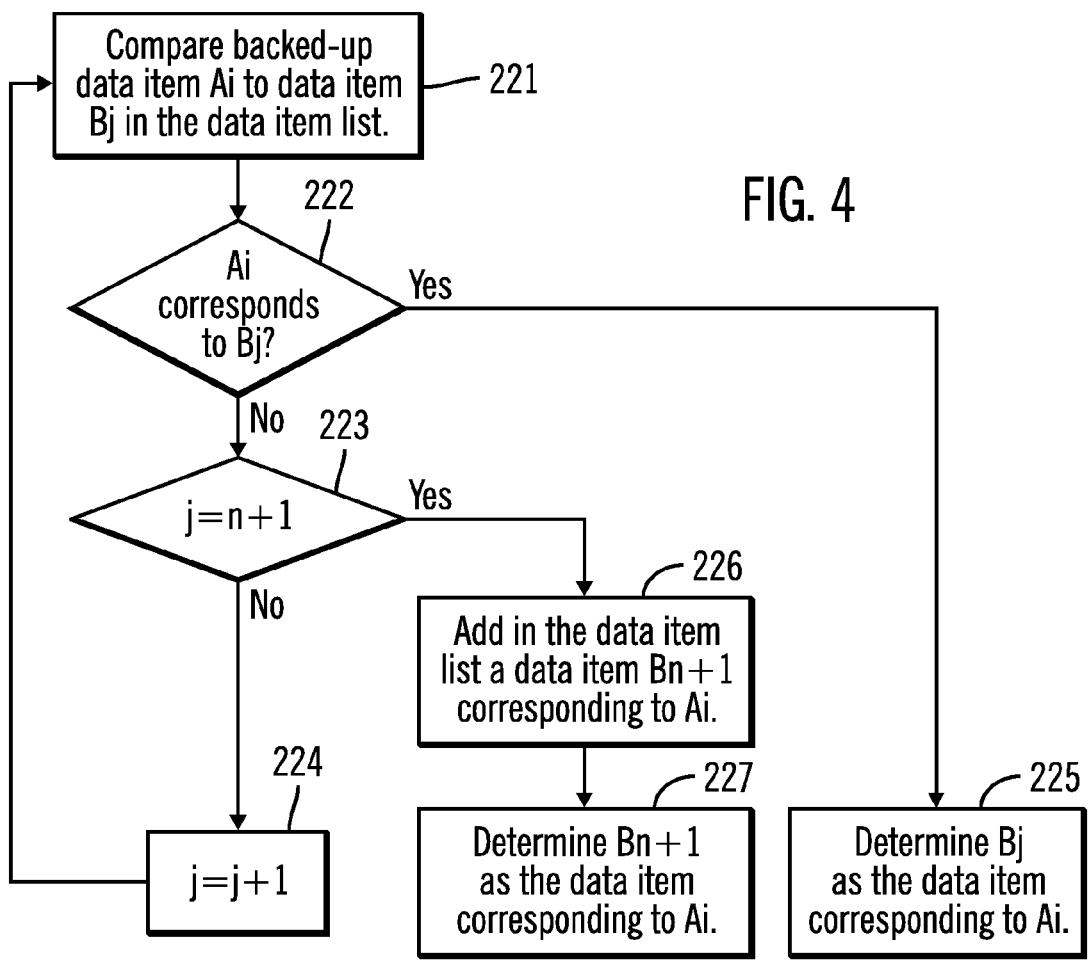
FIGS. 4, 6, and 7 illustrate embodiments of operations to contain the backed-up data items in a data item list.

FIG. 4 shows a specific way of executing step 22 according to one embodiment. As shown in FIG. 4, in step 221, a backed-up data item Ai obtained in step 20 is compared to a data item Bj in the data item list in existing data information. For the initial comparison, j=0. Then, in step 222, it is judged whether the two data items correspond to one another. The judgment may be based on the names of the data items or other identification information. If they correspond to one another, then the method proceeds to step 225 to determine Bj in the data item list as a data item corresponding to Ai. If the judgment result in step 222 is that they do not correspond to one another, then the method proceeds to step 223 to continue to judge whether j is equal to n, the number of data items in the data item list, that is, to judge whether Bj is the last data item in the data item list. If Bj is not the last data item, then j will be increased by 1 in step 224, that is, the method proceeds to a next data item in the data item list, and then returns to step 221 to compare Ai to the new Bj. If Bj is the last data item in the data item list, it means there is no data item corresponding to Ai in the entire existing data item list, or, backed-up data item Ai is a data item newly added in this backup operation. At this time, the method proceeds to step 226 of adding in the data item list a data item Bn+1 corresponding to Ai, and to step 227 of determining Bn+1 in the data item list as the data item corresponding to Ai. Through the above steps, the data item list is made to contain the backed-up data item Ai, and the data item corresponding to Ai may be determined in the data item list.

After the above steps are executed with respect to the backed-up data item Ai, i may be increased by 1, that is, the method proceeds to a next backed-up data item, and the above steps are executed similarly for it. With the above process being executed with respect to each backed-up data item, the data item list may contain all the backed-up data items, and data items corresponding to the backed-up data items can be determined in the data item list.

On the other hand, in step 24, a status list corresponding to this backup operation is added in the backup information. In this status list, backed-up status flag is added for the determined data item (Bj or Bn+1) corresponding to the backed-up data item Ai.

In one example, after the steps in FIG. 4 are executed with respect to each backed-up data item Ai, step 24 is executed to add status flag for the corresponding data item. Alternatively, the steps in FIG. 4 may be executed sequentially with respect to all backed-up data items, and corresponding data items in the data item list are marked. Then step 24 is executed in which backed-up status flags are added for all these marked data items.

Figures 5, 6:
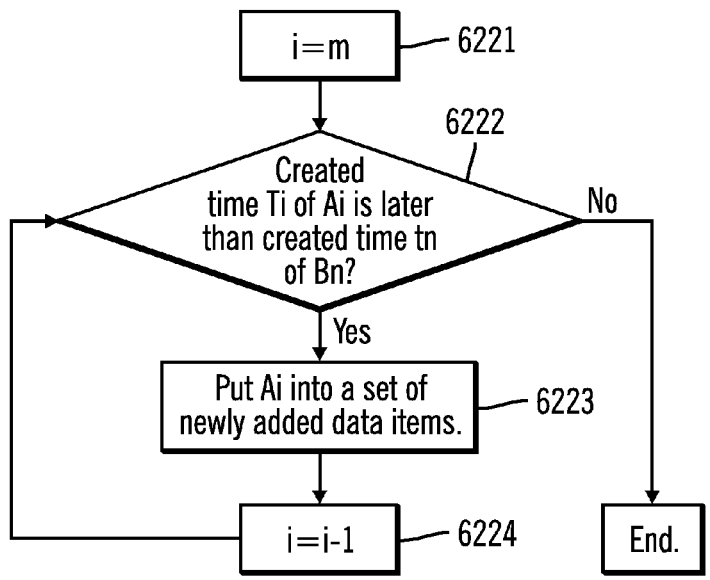
FIG. 5 is an embodiment of expanding the backup information.

FIG. 5 shows an example of expanding backup information. Table A in the left side of FIG. 5 schematically shows backed-up data items in a certain backup operation k (non-initial backup). The Table B in the middle shows existing backup information. It can be seen that the existing backup information contains a data item list, as well as status lists corresponding to backup operations 1 to k−1. The data item list contains data items I0 to I9, and in the status lists, status flags (1 or 0) show backup statuses of respective data items in the previous backup operations 1 to k−1. In order to record relevant information of this backup operation k on the basis of the existing backup information, according to the method of FIG. 4, the respective backed-up data items are compared to the data item list. For example, for the first backup data item I3, it can be determined by comparison that the fourth data item I3 in the data item list corresponds to it. Therefore, in the added status list corresponding to the backup operation k, backed-up status flag 1 is added for the fourth data item in the data item list. For the second backed-up data item I10, it can be determined by traversing the data item list that there is no data item in the data item list corresponding to it. Then, this new data item I10 is added into the data item list, and backed-up status flag 1 is added for this data item I10 in the status list corresponding to the backup operation k. By executing the above process for each backed-up data item, the expanded backup information as shown in the right side of Table C can be obtained. In this backup information, the data item list is made to contain backed-up data items of this backup operation, and data items in the data item list corresponding to the backed-up data items have been added with backed-up status flag 1 in the status list corresponding to this backup operation.

According to the method of FIG. 4, step 22 is executed by traversing the data item list many times. To further improve the computing speed, in another embodiment, backed-up data items and the data item list are ordered, and the backed-up data items are compared to the data item list orderly, thereby reducing the number of comparisons and improving efficiency.

Figure 7:
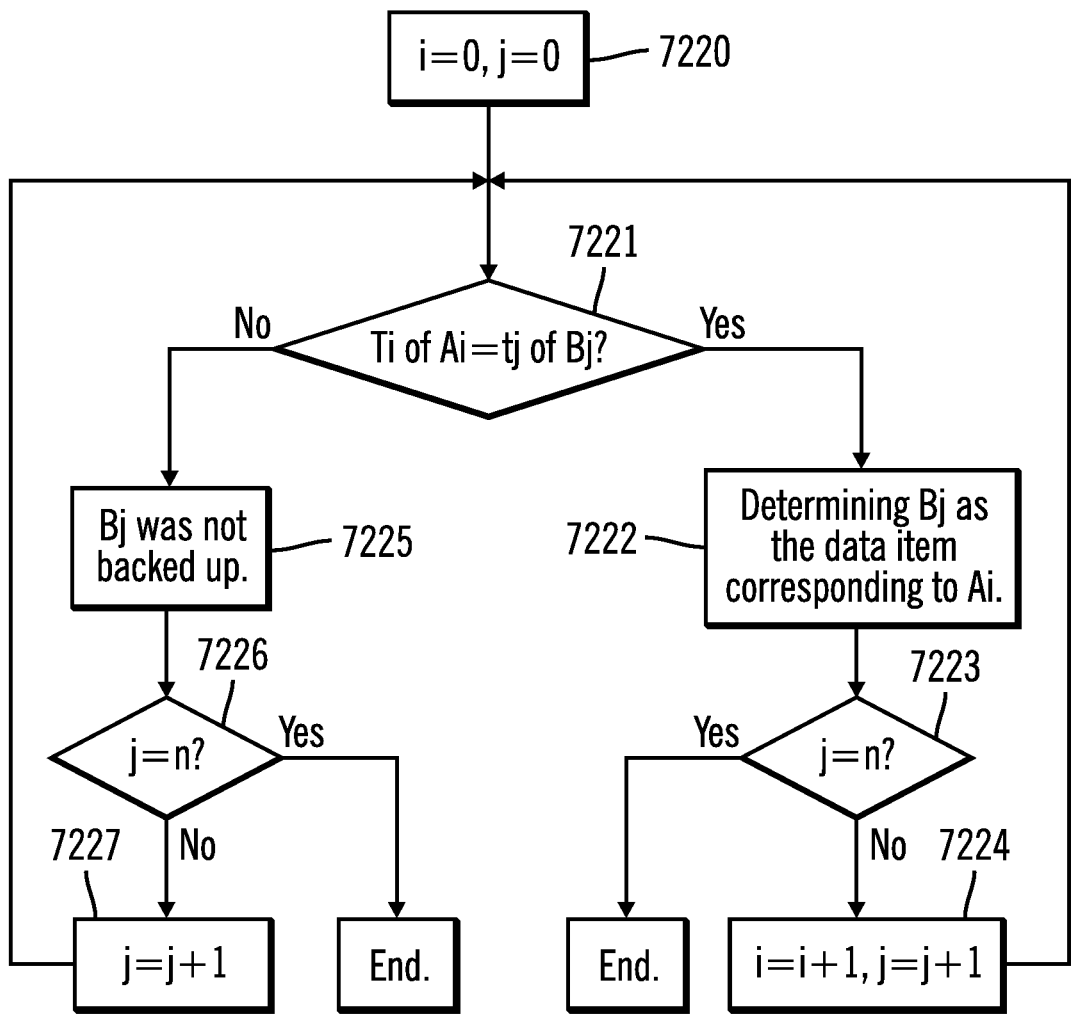

Specifically, in one embodiment, the information of the backed-up data items obtained in step 20 includes created time of the backed-up data items. And in step 20, the backed-up data items are arranged in chronological order according to the created time. Accordingly, when a data item list is created and maintained in response to the backup operation of the data set, data items in the data item list are also arranged in the order of the created time. This provides great convenience for following comparison of backed-up data items to the data item list. For a general description, it is assumed that the backed-up data items ordered according to the created time in this backup operation are A0, A1, . . . Am, the corresponding created time is T0, T1, . . . Tm respectively, and T0<T1< . . . <Tm. Correspondingly, the data item list in the existing backup information contains B0, B1, . . . Bn, the corresponding created time is t0, t1, . . . tn, and t0, <t1< . . . <tn. With respect to the backed-up data item Ai and the data item Bj in the data item list hereinabove, the method as shown in FIG. 6-7 may be executed, to map the backed-up data item into the data item list, that is, to execute step 22 of FIG. 2.

Specifically, FIG. 6 shows sub-steps of step 22 according to an embodiment. In the method in FIG. 6, in step 6221, the last data item Am in the backed-up data items is set to the currently compared data item firstly, that is, i=m. In step 6222, the created time Ti of the backed up data item Ai is compared to the created time tn of the last data item Bn in the data item list. If Ti>tn, that is, the created time of Ai is later than that of the latest data item in the data item list, it means the backed-up data item Ai is the newly added data item in this backup operation. Therefore, in step 6223, Ai is put into the set of newly added data items. Next, in step 6224, i=i−1, that is, the currently compared backed-up data item is set to Am-1. Then, back to step 6222, the created time is compared. Until for a specific i=i0, the judgment result in step 6222 is negative, this comparison is ended. At this point, the set of newly added data items includes data items Am, Am-1, . . . Ai0+1. Through the above steps in FIG. 6, the created time of the backed-up data items upward from the end is compared to that of the last data item in the data item list, so as to quickly find out newly added data items among the backed-up data items. These newly added data items are added in the order of created time into the end of the data item list, so that the data item list will contain all the backed-up data items. And, these data items added to the end of the data item list are certainly data items corresponding to the backed-up data items, and then in step 24, they are added with backed-up status flags in the status list.

The method in FIG. 6 is favorable for quickly determining the newly added backed-up data items. In another embodiment, the comparison is started from the top of the backed-up data items to record backup information, as shown in FIG. 7. Specifically, FIG. 7 shows sub-steps of step 22 according to another embodiment. As shown in FIG. 7, firstly in step 7220, the starting point of the comparison is set at the top of the backed-up data items Ai=A0 and at the first data item in the data item list Bj=B0. Then, in step 7221, the created time Ti of the backed-up data item Ai is compared to the created time tj of data item Bj in the data item list. Since different data items will inevitably have different created time, through the created time, one data item can be uniquely identified. If Ti=tj, it means the backed-up data item Ai and data item Bj in the data item list are the same data item. Therefore, in step 7222, in response to the judgment result of Ti=tj, Bj is determined as the data item corresponding to Ai. Then, in step 7223, it is judged whether j is equal to the number n of data items in the data item list, that is, it is determined whether the process proceeds to the last entry of the data item list. If j=n, then this comparison is ended. If j<n, then in step 7224, both i and j are increased by 1, and then back to step 7221, the next backed-up data item is compared to next entry in the data item list.

If in step 7221, Ti and tj are not equal, then the process proceeds to step 7225 in which it is deemed that the data item Bj in the data item list has not been backed up in this backup operation. In order to find a corresponding data item in the data item list for the backed-up data item Ai, it is required to judge next entry sequentially in the data item list. Specifically, in step 7226, it is judged whether j is equal to n. If not, the method proceeds to step 7227 of increasing j by 1, and then back to step 7221 of comparing the above Ai to next entry in the data item list until a corresponding Bj is found or j=n. Therefore, in the method of FIG. 7, for any backed-up data item Ai, there are two results. One is that a corresponding data item is found in the data item list, as shown in step 7222, and in this case, this backed-up data item is a data item which has been contained in the data item list already. The other is that there is no corresponding data item found for a certain i=i0 until the comparison is ended at j=n. Then, it can be deemed that backed-up data items starting from i=i0 are newly added data items.

According to the method of FIG. 7, step 7222 may determine data items corresponding to the backed-up data items in the data item list, step 7225 may determine data items which have been included in the data item list but are not backed up in this backup operation (that is, data items in the data item list not corresponding to the backed-up data items). As to backed-up data items whose corresponding data items cannot be found in the data item list through the method of FIG. 7, they can be deemed as newly added data items.

Based on the distinction of different types of data items in the data item list made in FIG. 7, in step 24, backed-up status flag is added easily for data items corresponding to the backed-up data items.

The process of executing the above method is described below in conjunction with specific examples.

Figures 8, 9:
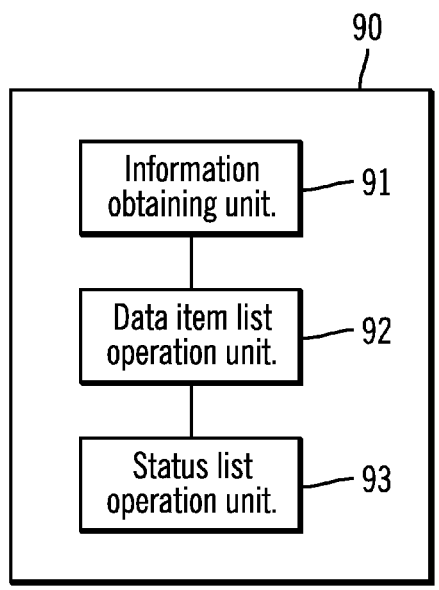
FIG. 8 is an embodiment of backed-up data items and backup information.
FIG. 9 is a schematic block diagram embodiment of an apparatus for recording backup information.

FIG. 8 shows backed-up data items and backup information according to an embodiment. A schematic table A on the left side of FIG. 8 shows information of backed-up data items obtained in a certain backup operation. This information includes not only names of the backed-up data items, but also the created time of the respective data items. Also, the respective data items are arranged in the order of the created time.

Table B in the middle of FIG. 8 shows existing backup information. In the data item list of the backup information, not only data items I0-I9 involved in previous backup operations but also the created time of these data items are recorded. And, similarly, these data items are also arranged in the order of the created time.

As to the backed-up data items as shown in FIG. 8, Table A and the data item list as shown in FIG. 8, Table B, newly added data items may be found out quickly through the method in FIG. 6. Specifically, backed-up data items in FIG. 8, Table A are compared from the bottom with the last entry I9 in data item list in terms of the created time. Since the created time of I12, I11, I10 is later than that of I9, it can be easily found that I10-I12 are newly added data items.

In addition, the method of FIG. 7 may also be executed for the above data item list and the backed-up data items. According to this method, the comparison of the created time is started downward from the top of the backed-up data items and the data item list, respectively. It can be found by comparison that the first backed-up data item (I0) matches the first entry of the data item list, i.e., A0=B0, and the second backed-up data matches the second entry in the data item list, i.e., A1=B1. In the subsequent comparison of A2 and B2, it can be found that they do not match, whereby it is deemed that B2 (i.e., I2) has not been backed up in this backup operation. Then downward along the data item list, the method continues to judge A2 and B3, A2 and B4, until obtains a matching B4. When A2 and B4 (data item I4) match, both the backed-up data items and the data item list are moved downward to judge A3 and B5 until to the end of the data item list.

Through the methods of FIGS. 6 and 7, newly added backed-up data items are identified and added into the data item list. As a result, the data item list contains backed-up data items of this backup operation. Also, the above methods also determine data items corresponding to the backed-up data items in the data item list. By adding backed-up status flags for these data items in the status list corresponding to this backup operation, backup information expanded with respect to this backup operation may be obtained as shown in FIG. 8, Table C.

The process of recording the backup information in FIG. 8, Table C is described in conjunction with the methods of FIGS. 6 and 7 hereinabove. However, FIGS. 6 and 7 may also be combined or modified. For instance, in one example, the method of FIG. 6 may be executed first for the obtained backed-up data items and the data item list to quickly obtain the newly added data item, and then the comparison from top to bottom is performed according to the method of FIG. 7 to judge other data items. In another example, based on the steps in FIG. 6, the comparison from bottom to top is executed continuously. This comparison is similar to that in FIG. 7, that is, the comparison is started from the backed-up data item Ai at the end of the backed-up data items with newly added data items being excluded and the last data item list Bn at the end of the data item list, and if Ai and Bn match, both the backed-up data items and the data item list are moved up by one entry and the comparison is continued; while if they do not match, it is deemed that Bn has not been backed up in this backup operation, and then Ai and Bn−1 are compared. In another example, the method in FIG. 7 may be executed first, and for the rest of the backed-up data items, the method in FIG. 6 may be executed. Therefore, the methods of FIGS. 6 and 7 are merely for showing exemplarily the idea of determining, in a case where both the backed-up data items and the data item list are ordered according to the created time, the correspondence between them by traversing them once. Taught by such idea, FIGS. 6 and 7 may be extended, modified and combined, to obtain a variety of variants. Such variants should be covered within the inventive concept of the present invention.

In addition, the methods of FIGS. 6 and 7 are directed to backed-up data items and the data item list which are arranged in the order of the created time from earlier to the latest. However, in other embodiments, these data items may also be arranged in a reverse order, that is, the data item with the earliest created time is placed in the end. In other embodiments, the backed-up data items and the data item list may also be ordered according to other attribute of the data items as long as the attribute can uniquely identify the data items, and has monotonicity required for ordering.

It may be appreciated that by recording information related to the backup in response to each backup operation, backup information may be expanded continuously, clearly showing backup statuses of the respective data items in each backup operation, as shown in FIG. 5, Table C and in FIG. 8, Table C. In backup information exemplarily shown in FIG. 5, Table C and FIG. 8, Table C, only identification of each backup operation (backup 1, backup 2, etc.) is recorded. In other embodiments, the type of each backup operation may also be shown in the backup information, such as full backup, incremental backup, differential backup, so that the backup information is more comprehensive and clear. In one embodiment, in contrary to data items added with backed-up status flag, other data items in the data item list may be added with non-backed-up status flag "0". And, as to the newly added data items (such as I10 shown in FIG. 5C), non-backed-up status flag may also be added thereto in the status lists corresponding to each previous backup operation. Or, in one embodiment, only the backed-up data items are added with backed-up status flag, and other data items not having backed-up status flag are construed as non-backed-up data items.

In one embodiment, the above backup information may be recorded and stored locally with the data set. In another embodiment, the recording and storage of the above backup information may be performed at the service side. Or alternatively, after the backup information is recorded locally with the data set or at the service side, such backup information may be provided to another party. And, the backup information may be recorded and stored in a variety of formats, for example, in the form of a table, in the form of index, etc.

The backup information obtained above is very helpful for data item query due to its ability of clearly showing the backup status of each data item in each backup operation. In one embodiment, the method of FIG. 2 further comprises providing the recorded backup information for data item query. With backup information so provided, it is easily to query and obtain various information related to the backup of data items, for example, whether a particular data item has been backed up in a certain backup operation, how many times a particular data item has been modified throughout the backup process (indicated by incremental backup or differential backup), when a particular data item was backed up for the last time, and so on. Therefore, the record and provision of the backup information may facilitate the query of the data items in the backup process, thereby improving query efficiency.

Based on the same inventive concept, the present invention further provides an apparatus for recording backup information. FIG. 9 shows a schematic block diagram of the apparatus for recording backup information according to an embodiment. As shown in FIG. 9, the apparatus as a whole is denoted as 90. Specifically, the apparatus 90 comprises: an information obtaining unit 91 configured to obtain, in response to a backup operation of a data set, information of backed-up data items in the backup operation; a data item list operation unit 92 configured to contain the backed-up data items in a data item list of the backup information for the data set, and to determine data items corresponding to the backed-up data items in the data item list; a status list operation unit 93 configured to add a status list corresponding to the backup operation in the backup information, so that the data items corresponding to the backed-up data items in the data item list have backed-up status flags in the status list.

The specific ways of executing the above units may refer to the above description of process steps in conjunction with specific examples, and will not be described any more here.

In one embodiment, the apparatus 90 may be integrated into an existing backup or query tool as its functional enhancements. In another embodiment, the apparatus 90 may be used as a stand-alone apparatus to provide the recorded backup information to users or other tools.

With the above method and apparatus, the backup information in the data set backup process can be recorded to show backup statuses of respective data items in each backup operation. The record and provision of the backup information may greatly facilitate the query for data items.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for recording backup information for a backup of a data set, the computer program product comprising a tangible computer readable storage medium having computer readable program code embodied therein that is executable to perform operations, the operations comprising:
    in response to a backup operation of a data set, obtaining information of backed-up data items in the backup operation;
    maintaining data item entries for the backed-up data items in a data item list of the backup information for the data set;
    determining the backed-up data items corresponding to the data item entries in the data item list;
    adding to status lists non-backed-up status flags for data item entries not corresponding to the backed-up data items from the backup operations; and
    adding to the status lists corresponding to a previous backup operation, non-backed-up status flags to newly added data items in the data item list.

2. The computer program product of claim 1, wherein, the information of the backed-up data items is obtained based on an index file of the data set in the backup operation.

3. The computer program product of claim 1, wherein the backup operation is an initial backup operation for the data set, wherein the operations further comprise:
    creating the data item list based on the backed-up data items; and
    adding in the status lists backed-up status flags for the backed-up data items in the created data item list.

4. The computer program product of claim 1, wherein the operations further comprise:
    comparing the backed-up data items to the data item entries to determine whether they correspond to one another; and
    in response to determining that no data item entry in the data item list corresponds to one of the backed-up data items, adding a new data item entry to the data item list for the backed-up data item not having one corresponding data item entry.

5. The computer program product of claim 1, wherein the information of the backed-up data items comprises created times of the backed-up data items, and the backed-up data items are arranged in the order of the created times while data item entries in the data item list are arranged in the order of the created times.

6. The computer program product of claim 5, wherein the operations further comprise:
    starting from the backed-up data item with a latest created time, comparing the backed-up data items to a last data item entry at an the end of the data item list arranged according to the created times, and adding data entries to the data item list for backed-up data items having the created times later than the created time of the last data item entry in the data item list.

7. The computer program product of claim 5, wherein the operations further comprise:
    starting from a top of the backed-up data items and a top of the data item list, comparing the created times downward of the backed-up data items and of data item entries in the data item list, and determining one of the data item entries in the data item list having a created time equal to the created time of one of the backed-up data items as the data.

8. The computer program product of claim 5, wherein the operations further comprise:
    starting from an end of the backed-up data items and the data item list, comparing the created times upward of the backed-up data items and of data item entries in the data item list, and determining a data item entry in the data item list with a created time equal to the created time of one of the backed-up data items as the data item entry corresponding to the backed-up data item having the equal created time.

9. The computer program product of claim 1, further comprising providing the backup information including the data item list for a query for data items.

10. A system for recording backup information of a backup of a data set, comprising:
    a processor;

a computer readable storage medium including code executable by the processor to perform operations, the operations comprising:

in response to a backup operation of a data set, obtaining information of backed-up data items in the backup operation;

maintaining data item entries for the backed-up data items in a data item list of the backup information for the data set;

determining the backed-up data items corresponding to the data item entries in the data item list;

adding to status lists non-backed-up status flags for data item entries not corresponding to the backed-up data items from the backup operations; and adding to the status lists corresponding to a previous backup operation, non-backed-up status flags to newly added data items in the data item list.

11. The system of claim 10, wherein the operations further comprise:

comparing the backed-up data items to the data item entries to determine whether they correspond to one another; and in response to determining that no data item entry in the data item list corresponds to one of the backed-up data items, adding a new data item entry to the data item list for the backed-up data item not having one corresponding data item entry.

12. The system of claim 10, wherein the information of the backed-up data items comprises created times of the backed-up data items, and the backed-up data items are arranged in the order of the created times while data item entries in the data item list are arranged in the order of the created times.

13. The system of claim 12, wherein the operations further comprise:

starting from the backed-up data item with a latest created time, comparing the backed-up data items to a last data item entry at an the end of the data item list arranged according to the created times, and adding data entries to the data item list for backed-up data items having the created times later than the created time of the last data item entry in the data item list.

14. The system of claim 12, wherein the operations further comprise:

starting from a top of the backed-up data items and a top of the data item list, comparing the created times downward of the backed-up data items and of data item entries in the data item list, and determining one of the data item entries in the data item list having a created time equal to the created time of one of the backed-up data items as the data item entry corresponding to the backed-up data item having the equal created time.

15. The system of claim 12, wherein the operations further comprise:

starting from an end of the backed-up data items and the data item list, comparing the created times upward of the backed-up data items and of data item entries in the data item list, and determining a data item entry in the data item list with a created time equal to the created time of one of the backed-up data items as the data item entry corresponding to the backed-up data item having the equal created time.

16. A method, performed by a processor, for recording backup information of a data set in a computer readable storage medium, comprising:

in response to a backup operation of a data set, obtaining information of backed-up data items in the backup operation;

maintaining data item entries for the backed-up data items in a data item list of the backup information for the data set;

determining the backed-up data items corresponding to the data item entries in the data item list;

adding to status lists non-backed-up status flags for data item entries not corresponding to the backed-up data items from the backup operations; and adding to the status lists corresponding to a previous backup operation, non-backed-up status flags to newly added data items in the data item list.

17. The method of claim 16, further comprising:

comparing the backed-up data items to the data item entries to determine whether they correspond to one another; and in response to determining that no data item entry in the data item list corresponds to one of the backed-up data items, adding a new data item entry to the data item list for the backed-up data item not having one corresponding data item entry.

18. The method of claim 16, wherein the information of the backed-up data items comprises created times of the backed-up data items, and the backed-up data items are arranged in the order of the created times while data item entries in the data item list are arranged in the order of the created times.

19. The method of claim 18, further comprising:

starting from the backed-up data item with a latest created time, comparing the backed-up data items to a last data item entry at an the end of the data item list arranged according to the created times, and adding data entries to the data item list for backed-up data items having the created times later than the created time of the last data item entry in the data item list.

20. The method of claim 18, further comprising:

starting from a top of the backed-up data items and a top of the data item list, comparing the created times downward of the backed-up data items and of data item entries in the data item list, and determining one of the data item entries in the data item list having a created time equal to the created time of one of the backed-up data items as the data item entry corresponding to the backed-up data item having the equal created time.

21. The method of claim 18, further comprising:

starting from an end of the backed-up data items and the data item list, comparing the created times upward of the backed-up data items and of data item entries in the data item list, and determining a data item entry in the data item list with a created time equal to the created time of one of the backed-up data items as the data item entry corresponding to the backed-up data item having the equal created time.

* * * * *